US011372998B2

(12) United States Patent
Turgeman et al.

(10) Patent No.: US 11,372,998 B2
(45) Date of Patent: Jun. 28, 2022

(54) CONSTRAINT QUERYING FOR COLLABORATIVE INTELLIGENCE AND CONSTRAINT COMPUTING

(71) Applicant: MICROSOFT TECHNOLOGY LICENSING, LLC, Redmond, WA (US)

(72) Inventors: Tomer Turgeman, Tel Aviv (IL); Yisroel Gershon Taber, Raanana (IL); Lev Rozenbaum, Kfar-Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/388,703

(22) Filed: Apr. 18, 2019

(65) Prior Publication Data

US 2020/0334375 A1  Oct. 22, 2020

(51) Int. Cl.
*G06F 21/62* (2013.01)
*G06F 16/2452* (2019.01)

(52) U.S. Cl.
CPC ...... *G06F 21/6227* (2013.01); *G06F 16/2452* (2019.01)

(58) Field of Classification Search
CPC ................ G06F 21/6227; G06F 16/2452
(Continued)

(56) References Cited

U.S. PATENT DOCUMENTS 8,478,722 B2 *  7/2013  Lee ............... G06Q 30/02
                                                      707/622
9,195,850 B2    11/2015  Hess
(Continued)

FOREIGN PATENT DOCUMENTS

EP        3477527 A1    5/2019
WO    2006076520 A2    7/2006

OTHER PUBLICATIONS

Wenfei, "Data Quality: From Theory to Practice", Sep. 2015, SIGMOD, vol. 44, pp. 7-18 (Year: 2015).*
(Continued)

*Primary Examiner* — Taghi T Arani
*Assistant Examiner* — Gregory A Lane
(74) *Attorney, Agent, or Firm* — Shook, Hardy & Bacon L.L.P.

(57) ABSTRACT

Embodiments of the present disclosure are directed to techniques for constraint querying that allow data consumers to query collaborative data in a trustee environment, subject to configurable constraints, to derive collaborative intelligence without exposing underlying raw data provided by the tenants or collaborative data shielded by the trustee environment. Constraints can be applied in response to a query in multiple ways, including reformatting a query prior to execution, applying constraints after executing a query, constraining eligible queries for execution, applying access constraints prior to execution, and others. To reformat a query subject to constraints, the query can be parsed into an execution tree, which can be reformatted into a constrained execution tree by replacing executable units of logic inconsistent with a particular constraint with custom executable units of logic consistent with the constraint. The constrained execution tree can be translated into the language used by the trustee environment and forwarded for execution.

20 Claims, 10 Drawing Sheets

(58) Field of Classification Search
USPC .......................................................... 726/28
See application file for complete search history.

(56) References Cited

U.S. PATENT DOCUMENTS

| | | | |
|---|---|---|---|
| 9,703,834 | B2 | 7/2017 | Sityon et al. |
| 9,817,991 | B2 | 11/2017 | Boncha et al. |
| 10,642,832 | B1* | 5/2020 | Neumann ......... G06F 16/24535 |
| 10,834,087 | B1 | 11/2020 | Pillai et al. |
| 2004/0083217 | A1 | 4/2004 | Brackett et al. |
| 2004/0111639 | A1 | 6/2004 | Schwartz et al. |
| 2006/0080554 | A1 | 4/2006 | Mcdonald et al. |
| 2007/0073695 | A1 | 3/2007 | Conlan et al. |
| 2007/0130616 | A1 | 6/2007 | Ng et al. |
| 2009/0282045 | A1 | 11/2009 | Hsieh et al. |
| 2012/0143922 | A1 | 6/2012 | Rane et al. |
| 2013/0007835 | A1 | 1/2013 | Iyer et al. |
| 2013/0276134 | A1 | 10/2013 | Meredith et al. |
| 2014/0173720 | A1 | 6/2014 | Jain et al. |
| 2015/0163206 | A1 | 6/2015 | Mccarthy et al. |
| 2015/0379082 | A1* | 12/2015 | Hu ...................... G06F 16/2452 707/718 |
| 2016/0132553 | A1* | 5/2016 | Seo ..................... G06F 16/9535 726/28 |
| 2016/0132686 | A1* | 5/2016 | Peng ................... G06F 21/6218 726/28 |
| 2017/0235645 | A1 | 8/2017 | Theimer et al. |
| 2017/0364553 | A1 | 12/2017 | Jacob et al. |
| 2018/0032576 | A1 | 2/2018 | Romero |
| 2018/0053012 | A1 | 2/2018 | Myers et al. |
| 2018/0060603 | A1 | 3/2018 | Ahmed et al. |
| 2018/0210936 | A1 | 7/2018 | Reynolds et al. |
| 2018/0225630 | A1 | 8/2018 | Creager et al. |
| 2018/0322168 | A1 | 11/2018 | Levine et al. |
| 2018/0349384 | A1 | 12/2018 | Nerurkar et al. |
| 2019/0147085 | A1* | 5/2019 | Pal ..................... G06F 16/24542 707/718 |
| 2019/0207974 | A1* | 7/2019 | Jas ..................... G06F 21/6227 |
| 2019/0213346 | A1 | 7/2019 | Friedman |
| 2019/0236598 | A1 | 8/2019 | Padmanabhan |
| 2020/0250334 | A1 | 8/2020 | Bandi et al. |
| 2020/0334259 | A1 | 10/2020 | Taber et al. |
| 2020/0334370 | A1 | 10/2020 | Turgeman et al. |
| 2020/0334377 | A1 | 10/2020 | Turgeman et al. |
| 2020/0336488 | A1 | 10/2020 | Turgeman et al. |

OTHER PUBLICATIONS

"International Search Report and Written Opinion Issued in PCT Application No. PCT/US2020/026488", dated Jun. 16, 2020, 15 Pages.

"International Search Report and Written Opinion Issued in PCT Application No. PCT/US2020/023037", dated May 29, 2020, 17 Pages.

"International Search Report and Written Opinion Issued in PCT Application No. PCT/US2020/023234", dated Jun. 8, 2020, 12 Pages.

"International Search Report and Written Opinion Issued in PCT Application No. PCT/US2020/023043", dated May 15, 2020, 14 Pages.

"International Search Report and Written Opinion Issued in PCT Application No. PCT/US20/024331", dated Jun. 15, 2020, 15 Pages.

"Non Final Office Action Issued in U.S. Appl. No. 16/388,696", dated Oct. 30, 2020, 23 Pages.

"Non Final Office Action Issued in U.S. Appl. No. 16/388,700", dated Dec. 11, 2020, 20 Pages.

"Non Final Office Action Issued in U.S. Appl. No. 16/388,696", dated Aug. 20, 2021, 21 Pages.

"Notice of Allowance Issued in U.S. Appl. No. 16/736,399", dated Sep. 24, 2021, 9 Pages.

Xiao, et al., "Security and Privacy in Cloud Computing", In Proceedings of IEEE Communications Surveys & Tutorials, vol. 15, Issue 2, First Quarter 2013, pp. 843-859.

"Final Office Action Issued In U.S. Appl. No. 16/388,696", dated May 3, 2021, 22 Pages.

"Non Final Office Action Issued in U.S. Appl. No. 16/665,916", dated May 14, 2021, 22 Pages.

"Advisory Office Action Issued in U.S. Appl. No. 16/388,696", dated Jul. 15, 2021, 4 Pages.

"Non Final Office Action Issued in U.S. Appl. No. 16/736,399", dated Jun. 11, 2021, 21 Pages.

"Final Office Action Issued in U.S. Appl. No. 16/388,700", dated Jun. 18, 2021, 22 Pages.

"Notice of Allowance Issued in U.S. Appl. No. 16/388,700", dated Oct. 7, 2021, 10 Pages.

"Non Final Office Action Issued In U.S. Appl. No. 17/009,414", dated Oct. 13, 2021, 14 Pages.

Sharma, et al., "Live Data Analytics with Collaborative Edge and Cloud Processing in Wireless IoT Networks", In Journal of IEEE Access, vol. 5, Apr. 24, 2017, pp. 4621-4635.

"Notice of Allowance Issued in U.S. Appl. No. 16/665,916", dated Nov. 29, 2021, 11 Pages.

"International Search Report and Written Opinion Issued in PCT Application No. PCT/US21/037147", dated Sep. 24, 2021, 10 Pages.

"International Search Report and Written Opinion Issued in PCT Application No. PCT/US21/037152", dated Sep. 24, 2021, 10 Pages.

"Notice of Allowance Issued in U.S. Appl. No. 17/009,414", dated Feb. 15, 2022, 10 Pages.

Papernot, et al., "SoK: Security and Privacy in Machine Learning", In IEEE European Symposium on Security and Privacy, Apr. 24, 2018, pp. 399-414.

"Final Office Action Issued in U.S. Appl. No. 16/388,696", dated Feb. 28, 2022, 21 Pages.

"Notice of Allowance Issued in U.S. Appl. No. 16/665,916", dated Mar. 23, 2022, 10 Pages.

"Notice of Allowance Issued in U.S. Appl. No. 16/388,700", dated Mar. 16, 2022, 10 Pages.

* cited by examiner

```
SELECT  storeid,
        AVG(sumbyuser) as AvgByUser
FROM    (SELECT storeid,
                Sum(total) AS sumByUser
         FROM data
         WHERE timestamp > Dateadd(day, -7, Getdate())
         GROUP BY customerid,
                  storeid) byUser
             GROUP BY storeid
```

310

320

```
                                                              420

SELECT storeid,
       Round(avgofuserinstore, 2) AS Average
FROM    (SELECT storeid,
                Avg(sumbyuser)               AS avgOfUserInStore,
                 Count(DISTINCT customerid) AS dCountUser,
                 Min(mintime)                AS aggMinTime,
                Max(maxtime)                 AS aggMaxTime
        FROM    (SELECT storeid,
                        customerid,
                        Sum(total)     AS sumByUser,
                         Min(timestamp) AS minTime,
                        Max(timestamp) AS maxTime
                FROM data
                WHERE timestamp > Dateadd(day, -7, Getdate())
                GROUP BY customerid,
                         storeid) byUser
        GROUP BY storeid) grouped
WHERE   Datediff(hour, aggmaxtime, aggmintime) > 48
                            AND dcountuser > 20
```

FIG. 4B

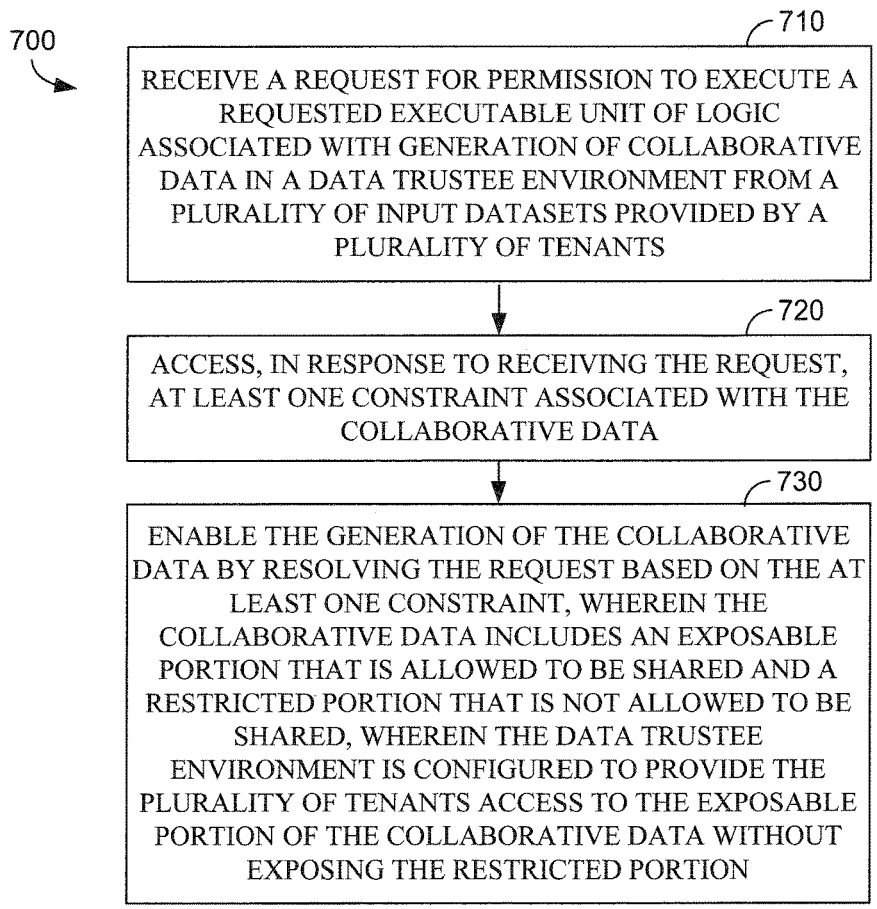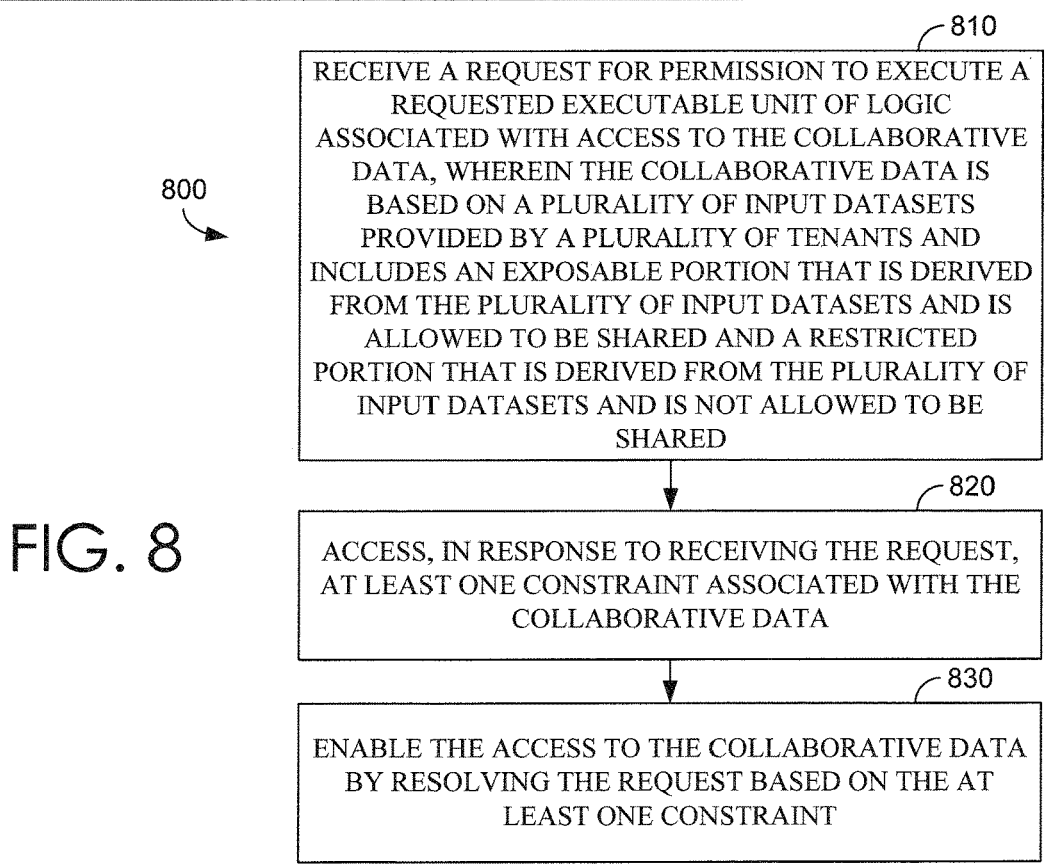

CONSTRAINT QUERYING FOR COLLABORATIVE INTELLIGENCE AND CONSTRAINT COMPUTING

BACKGROUND

Businesses and technologies increasingly rely on data. Many types of data can be observed, collected, derived, and analyzed for insights that inspire progress in science and technology. In many cases, valuable intelligence can be derived from datasets, and useful products and services can be developed based on that intelligence. This type of intelligence can help advance industries such as banking, education, government, health care, manufacturing, retail, and practically any other industry. However, in many cases, the datasets owned or available to a particular data owner are incomplete or limited in some fundamental way. Information sharing is one way to bridge gaps in datasets, and sharing data has become an increasingly common practice. There are many benefits from sharing data. However, there are also many concerns and obstacles.

SUMMARY

Embodiments of the present disclosure are directed to techniques for deriving collaborative intelligence based on constraint computing and querying. At a high level, a data trustee can operate a trustee environment that derives collaborative intelligence subject to configurable constraints, without sharing raw data. The trustee environment can include a data privacy pipeline through which data can be ingested, fused, derived, and sanitized to generate collaborative data without compromising data privacy. The collaborative data can be stored and queried to provide collaborative intelligence subject to the configurable constraints. In some embodiments, the data privacy pipeline is provided as a distributed computing or cloud computing service (cloud service) implemented in the trustee environment and can be spun up and spun down as needed.

To enable constraint computing and querying, a constraint manager can monitor and orchestrate the use and generation of collaborative data in the trustee environment subject to the constraints. As used herein, collaborative data refers to data that has been derived from shared input data (e.g., data from different users). Shared input data can come from any number of sources (e.g., different users), and can be processed to generate intermediate data, which itself can be processed to generate collaborative data. Collaborative data may include an exposable portion that is allowed to be shared and a restricted portion that is not allowed to be shared. Although the restricted portion of the collaborative data may not be shared, it may include an operable portion that may be used to derive collaborative intelligence that may be shared. In some embodiments, collaborative intelligence may be derived from exposable data and/or restricted data, and the collaborative intelligence may be provided without exposing the restricted data.

A user interface can be provided to enable tenants (e.g., customers, businesses, users) to specify desired computations and constraints on the use of and access to their data in the trustee environment, including eligible data sources and how their data can be processed or shared. Any number of various types of constraints may be implemented, including data access constraints, data processing constraints, data aggregation constraints, and data sanitation constraints, to name a few. The constraint manager can communicate with various components in the trustee environment to implement the constraints. For example, requests to execute an executable unit of logic such as a command or function call may be issued to the constraint manager, which can grant or deny permission. Permission may be granted subject to one or more conditions that implement the constraints, such as requiring the replacement of a particular executable unit of logic with a constrained executable unit of logic. As constraints are applied to generate collaborative data and intermediate data, any combination of schema, constraints, and/ or attribution metadata can be associated with the data. As such, the constraint manager can orchestrate constraint computing in the trustee environment.

In some embodiments, constraint querying can be applied to allow data consumers, associated with the trustee environment, to query collaborative data in the trustee environment subject to the constraints. Constraint querying can allow data consumers to access collaborative data or derive collaborative intelligence while enforcing the constraints to prevent exposing designated data (data that has been identified for enforcing a particular constraint). Constraints can be applied in response to a query in multiple ways, including reformatting a query prior to execution, applying constraints after executing a query, constraining eligible queries for execution, applying access constraints prior to execution, and others. To reformat a query subject to constraints, the query can be parsed into an execution tree comprising a hierarchical arrangement of executable units of logic that, when executed, implement the query. The execution tree can be reformatted into a constrained execution tree by replacing executable units of logic inconsistent with a particular constraint with custom executable units of logic that are consistent with the constraint. The constrained execution tree can be translated into a language used by the trustee environment and forwarded for execution.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein:

FIG. 4B is an example of a corresponding query, in accordance with embodiments described herein;

FIG. 7 is a flow diagram showing an example method for providing constrained computations for collaborative data in a data trustee environment, in accordance with embodiments described herein;

FIG. 8 is a flow diagram showing an example method for providing constrained access to collaborative data in a data trustee environment, in accordance with embodiments described herein;

DETAILED DESCRIPTION

Overview

Figure 1:
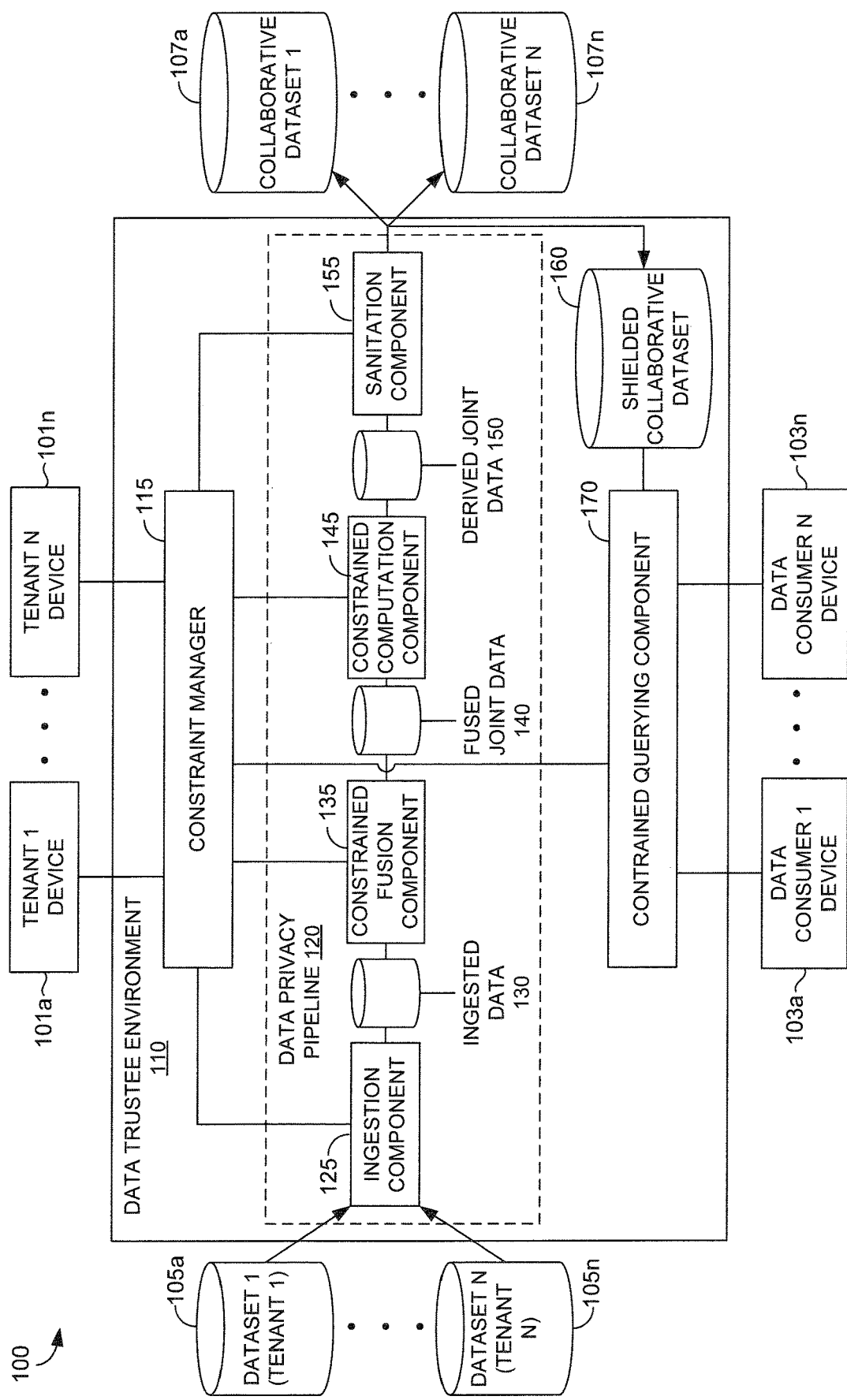
FIG. 1 is a block diagram of an example collaborative intelligence environment, in accordance with embodiments described herein.

There are many benefits from sharing data. For example, sharing data often leads to more complete datasets, encourages collaborative efforts, and produces better intelligence (e.g., understanding or knowledge of an event or circumstance, or information, relationships, and facts about different types of entities). Researchers benefit from more data being available. Further, sharing can stimulate interest in research and can incentivize the production of higher data quality. Generally, sharing can result in synergies and efficiencies in research and development.

However, there are also many concerns and obstacles to sharing data. As a practical matter, different industries vary in ability and willingness to share data. Issues with data privacy and confidentiality are fundamental to many industries such as health care and banking. In many cases, laws, regulations, and consumer demands place restrictions on the ability to share data. Furthermore, the act of observing, collecting, deriving, and analyzing datasets is often an expensive and labor-intensive exercise, and many have concerns that sharing data would give away a competitive advantage. Even when there is sufficient motivation to share data, issues with control and access to shared data are often an obstacle to sharing. In effect, the obstacles often prevent data sharing and the opportunities for progress that come with it. As such, there is a need for data sharing techniques that facilitate development of collaborative intelligence while ensuring data privacy and facilitating control and access to shared data.

Accordingly, embodiments of the present disclosure are directed to techniques for deriving collaborative intelligence based on constraint computing and constraint querying. At a high level, a data trustee can operate a trustee environment configured to derive collaborative intelligence for tenants subject to configurable constraints, without exposing underlying raw data provided by the tenants or collaborative data shielded by the trustee environment. As used herein, collaborative data refers to data that has been derived from shared input data (e.g., data from different users). Shared input data can come from any number of sources (e.g., different users), and can be processed to generate intermediate data, which itself can be processed to generate collaborative data. Collaborative data may include an exposable portion that is allowed to be shared and a restricted portion that is not allowed to be shared. Although the restricted portion of the collaborative data may not be shared, it may include an operable portion that may be used to derive collaborative intelligence that may be shared. In some embodiments, collaborative intelligence may be derived from exposable data and/or restricted data, and the collaborative intelligence may be provided without exposing the restricted data. For example, configurable constraints may programmatically manage limitations (e.g., allowing some operations, but not others) on certain underlying data (e.g., personally identifiable information, some other sensitive information, or any other designated information that is collected, stored, or used) and how the underlying data can and cannot be accessed, used, stored, or displayed (or variations thereof). Further, the configurable constraints may programmatically support collaborative intelligence operations on accessible data (e.g., deriving aggregate statistics), without displaying the individual data entries that were operated on.

By relying on trustee computing to perform data processing, tenants can derive collaborative intelligence from each other's data without compromising data privacy. To accomplish this, the trustee environment can include one or more data privacy pipelines through which data can be ingested, fused, derived, and/or sanitized to generate collaborative data. A data privacy pipeline can be provided as a distributed computing or cloud computing service (cloud service) implemented in the trustee environment, and can be spun up and spun down as needed. In some embodiments, tenants providing data into a data privacy pipeline cannot access the pipeline. Instead, the pipeline outputs collaborative data subject to constraints provided by one or more of the tenants. Depending on the designated constraints, the collaborative data can be output from the trustee environment (e.g., because it has been sanitized according to specified constraints) and/or may be stored in, and shielded by, the trustee environment. Shielded collaborative data can be queried to derive collaborative intelligence subject to the configurable constraints (e.g., without exposing the shielded collaborative data).

Generally, a data privacy pipeline can accept data provided by one or more tenants. Initially, the data privacy pipeline may determine whether input data is joint data pursuant to a contract or other tenant agreement with one or more tenants. Data that is determined to be joint data can be ingested, and data that is determined not to be joint data can be dropped. In this regard, joint data refers to any shared data that is designated for ingestion in generating collaborative data (e.g., as designated or otherwise identified in a tenant agreement with one more tenants). Ingested data can include data from multiple sources, so the data privacy pipeline may fuse data from multiple sources according to computations and constraints specified in the tenant agreement. For example, constrained data fusion can implement one or more constraints to combine ingested data to form fused joint data in any number of ways, including the use of one or more join operations (e.g., left, right, inner, outer, anti), custom joins (e.g., via imperative scripts), data appends, normalization operations, some combination thereof, and others.

In some embodiments, a data privacy pipeline can perform constrained computations to generate derived joint data. Constrained computing can take data from one source (e.g., ingested data, fused joint data) and perform any number of specified computations (e.g., arithmetic operations, aggregation, summarization, filtering, sorting, bounding). A simple example of a constraint computation is a calculation of average age per city, where the computation is only to be performed for a city if the underlying dataset includes entries for at least five people in the city. Additionally or alternatively, a data privacy pipeline can perform data sanitation to generate collaborative data that implements constraints for storage, access, precision, and the like. For example, data sanitation can implement constraints specified in the tenant agreement designating whether collaborative data should be shielded (e.g., stored in the trustee environment), whether collaborative data can be exported, whether exported collaborative data should be restricted (e.g., do not export email, credit card numbers, portions thereof), and the like. As such, a data privacy pipeline can generate collaborative data from data provided by one or more tenants, and provide agreed-upon access to the collaborative data without sharing the underlying raw data with all the tenants.

In some embodiments, to enable constraint computing and querying, the use and generation of collaborative data in a trustee environment can be monitored and orchestrated subject to configurable constraints. At a high level, constraints can be provided through a user interface to enable tenants (e.g., customers, businesses, users) to specify desired computations and constraints on the use of and access to their data in the trustee environment, including eligible data sources and how their data may be processed or shared. Any number of various types of constraints may be implemented, including data access constraints, data processing constraints, data aggregation constraints, and data sanitation constraints.

For example, data access constraints can be specified to allow or forbid access (e.g., to a specific user, account, organization). In some embodiments, designated constraints can be universal such that the constraints apply to all potential data consumers (e.g., only allow access to average age no matter the data consumer). In some embodiments, a designated constraint can be applied to a designated user, account, organization, and the like (e.g., do not allow group A to access salary data, but allow group B to access it). Generally, a tenant may specify constraints defining how the tenant's data can be merged with designated datasets or portions thereof, constraints limiting the schema of data being read from the tenant's data (e.g., specifying horizontal filtering to be applied to a tenant's data), constraints limiting the size of ingested data (e.g., specifying storage limitations, sub-sampling of the tenant's data, vertical filtering to be applied to a tenant's data), constraints limiting the schema of collaborative data that can be output, constraints defining ownership of collaborative data, constraints defining whether collaborative data should be open, encrypted, or shielded (e.g., stored in the trustee environment), and the like.

In some embodiments, various types of data processing constraints may be designated, such as constraints designating what operations can be performed (e.g., allowable and restricted computations, binary checks), constraints limiting a comparison precision (e.g., for numeric data, geographic data, date and time data), constraints limiting an accumulation precision (e.g., for geographical data, numerical data, date or time data), constraints limiting location bounding precision (e.g., limiting allowable geofencing determinations to specific grids, minimum geographic divisions such as neighborhood, county, city, state, or country, and the like), and other precision and/or data processing requirements.

Additionally or alternatively, one or more data aggregation constraints can be specified, such as constraints requiring a minimum aggregation amount (e.g., at least N rows or distinct field values), constraints requiring some statistical distribution condition to be valid (e.g., minimum standard deviation), constraints defining allowed aggregation functions (e.g., allow min, max, average, but not percentiles), to name a few examples.

In some embodiments, one or more data sanitation constraints can be specified, such as constraints requiring sanitation of personally identifiable information (e.g., remove e-mails, names, IDs, credit card numbers), constraints requiring lower precision sanitation (e.g., lower the numeric, data and time, and/or geographical precision), constraints requiring sanitization of values coming from specific fields (which may entail tracking transformations applied in a data privacy pipeline), constraints requiring custom sanitations (e.g., requiring execution of one or more custom and/or third party sanitation scripts), constraints requiring data masking (e.g., output certain data such as phone numbers, credit cards, dates, but mask a portion of the number), and the like.

Additionally or alternatively to the constraints listed above, one or more constraints can be specified limiting a number of allowable queries and/or data accesses per unit time (e.g., minute, hour, day). Such a constraint can operate to reduce the risk of brute-force attempts to reverse engineer shielded data by asking a set of slightly different questions within a relatively small time window. In general, one or more custom constraints can be specified such as a constraint requiring that some designated property match some designated criteria. These and other types of constraints are contemplated within the present disclosure.

In some embodiments, a constraint manager can monitor and orchestrate data flow, generation, and access, subject to the designated constraints. For example, the constraint manager can communicate with various components in the trustee environment (e.g., a data privacy pipeline) to implement the constraints, which may be maintained in a contract database accessible to the constraint manager. In some embodiments, components can issue requests to the constraint manager for permission to execute a particular command, function call, or other executable unit of logic. The constraint manager can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any portion of a data privacy pipeline, constrained querying). Accordingly, corresponding functionality enforcing a constraint can be applied at any step, or multiple steps. In some embodiments, enforcement of certain constraints can be allocated to certain portions of a data privacy pipeline (e.g., data access constraints get applied during ingestion, processing and aggregation constraints get applied during data fusion and/or constrained computation, sanitation constraints get applied during data sanitation). In another example, a particular data access constraint (e.g., only pass data for patients who participated in at least five different studies) may be applied during data fusion. These are meant merely as examples, and any suitable constraint enforcement regime may be implemented within the present disclosure.

Enforcement of a constraint (e.g., precision or aggregation constraints) on a particular executable unit of logic (e.g., for a designated computation, a requested operation) can result in any number of scenarios. In one example, a particular executable unit of logic can be rejected entirely. In another example, a particular executable unit of logic can be allowed, but the result is filtered (e.g., no value is returned for a particular row or entry of data). In yet another example, a particular executable unit of logic can be allowed, but the result is changed (e.g., precision reduced, a question is answered with false). These and other variations may be implemented.

As constraints are applied to generate collaborative data, any combination of schema, constraints, and/or attribution metadata can be associated with the collaborative data, intermediate data used to arrive at the collaborative data, or otherwise. Generally, constraints can be enforced across multiple steps and computations. As such, in some embodiments, applicable and/or satisfied constraints for each step can be tracked and/or associated with data produced by a given step. Taking aggregation constraints as an example, once an aggregation constraint has been fulfilled during a particular step, subsequent steps no longer need to consider this constraint. In another example where different constraints have been specified for different datasets to be merged, a merging operation may only need to apply the stricter constraint. Generally, an appropriate allocation or combination of constraints can be applied and/or tracked as data flows through a data privacy pipeline. This tracking can facilitate validating whether a particular constraint has been applied to particular data. Accordingly, as constraints are applied and data is generated, corresponding schema, applicable or satisfied constraints, and/or attribution metadata indicating ownership or providence can be associated with a dataset, or a corresponding entry, row, field, or other element of data. In some embodiments, any intermediate data used in arriving at collaborative data (e.g., ingested data, fused joint data, derived joint data) may be deleted, and collaborative data may be stored in the trustee environment and/or provided as an output, depending on an applicable constraint.

In some embodiments, constraint querying can be applied to allow data consumers to query collaborative data in a trustee environment subject to configurable constraints. At a high level, constraint querying can operate as a search engine that allows data consumers to access or derive collaborative intelligence from collaborative data without exposing underlying raw data provided by the tenants or collaborative data shielded by the trustee environment. Constraints can be applied in response to a query in any number of ways, including reformatting a query prior to execution, applying constraints after executing a query, constraining eligible queries for execution, applying access constraints prior to execution, and others.

By way of nonlimiting example, an issued query can be validated against a specified aggregation constraint by ensuring that the query contains at least one aggregation element and ensuring that the aggregation element(s) are consistent the aggregation constraint. In another example, an execution plan corresponding to the issued query can be executed, and the results can be validated against the aggregation constraint and/or the aggregation element(s) of the query (e.g., confirming the results correspond to a requested number of distinct rows, fields, statistical distribution). In some embodiments, a constraint can be enforced on a corresponding element of a query by modifying the element based on the constraint (e.g., to limit a corresponding number of distinct rows, fields, statistical distribution), by executing the modified element prior to the other elements of the query, some combination thereof, or otherwise.

By way of background, queries are generally not executable code. In order to execute a query, it is normally converted into an execution plan that is executable. In some embodiments, in order to enforce constraints on a received query, the query can be parsed into a corresponding execution tree comprising a hierarchical arrangement of executable units of logic that, when executed, implement the query. Applicable constraints can be accessed, and the executable units of logic can be validated against the constraints. In some embodiments, if one or more of the executable units of logic is not allowed, the query can effectively be reformatted by altering one or more of the executable units of logic based on one or more constraints. More specifically, the execution tree corresponding to the query can be reformatted into a constrained execution tree by traversing the execution tree and replacing executable units of logic inconsistent with a particular constraint with custom executable units of logic that are consistent with the constraint. Additionally or alternatively, one or more executable units of logic may be added to the constrained execution tree to enforce constraints (e.g., precision constraints) on the output. These are simply meant as examples, and any suitable technique for generating a constrained execution tree can be implemented.

Generally, an executable unit of logic of an execution tree can be validated against a corresponding constraint context comprising an applicable accessed constraint and runtime information such as information identifying the requesting data consumer issuing the query, information identifying an applicable tenant agreement, information identifying target collaborative data on which to operate, and the like. Validation of an executable unit of logic can involve validation of a constituent command or operation, one or more constituent parameters, and/or consideration of other parts of the execution tree. Validation of an executable unit of logic can result in a number of possible results. For example, an executable unit of logic can be allowed (e.g., the executable unit of logic can be copied into a constrained execution tree), an executable unit of logic can be disallowed (e.g., the query can be disallowed in its entirety), or an executable unit of logic can be allowed but with changes (e.g., copying a corresponding constrained executable unit of logic into the constrained execution tree). In some embodiments, the resulting constrained execution tree is translated into a language used by the trustee environment. The resulting execution tree can be executed (e.g., by traversing and executing the hierarchy of executable units of logic of the tree), and the results can be returned to the requesting data consumer.

As such, using implementations described herein, users can efficiently and effectively share data through a data trustee that allows them derive collaborative intelligence, while ensuring data privacy and providing configurable control and access to shared data.

Example Collaborative Intelligence Environment

Referring now to FIG. 1, a block diagram of example collaborative intelligence environment 100 suitable for use in implementing embodiments of the invention is shown. Generally, collaborative intelligence environment 100 is suitable for generation of collaborative intelligence, and, among other things, facilitates constraint computing and constraint querying. Collaborative intelligence environment 100 or a portion thereof (e.g., data trustee environment 110) may, but need not, be implemented in a distributed computing environment such as distributed computing environment 1100, discussed below with respect to FIG. 11. Any or all of the components of collaborative intelligence environment 100 can be implemented as any kind of computing device, or some portion thereof. For example, in an embodiment, tenant devices 101*a* through 101*n* and data consumer devices 103*a* through 103*n* can each be a computing device such as computing device 1200, as described below with reference to FIG. 12. Further, data trustee environment 110 may be implemented using one or more such computing devices. In embodiments, these devices can be any combination of a personal computer (PC), a laptop computer, a workstation, a server, a mobile computing device, a PDA, a cell phone, or the like. The components of collaborative intelligence environment 100 may communicate with each other via one or more networks, which may include, without limitation, one or more local area networks (LANs) and/or wide area networks (WANs). Such networking environments are commonplace in offices, enterprise-wide computer networks, intranets, and the Internet.

Collaborative intelligence environment 100 includes data trustee environment 110 that is capable of deriving collaborative data and/or collaborate intelligence from raw data provided by data owners or providers (e.g., tenants) subject to configurable constraints, without sharing the raw data. Generally, any number of tenants can input their data (e.g., datasets 105*a* through 105*n*) into data trustee environment 110 and designate one or more constraints (e.g., from one of tenant devices 101*a* through 101*n*). Data trustee environment 110 can derive collaborative data (e.g., collaborative datasets 107*a* through 107*n*, shielded collaborative dataset 160) based on the one or more constraints. Any number of data consumers (e.g., operating one of data consumer devices 103*a* through 103*n*) may issue queries on shielded collaborative dataset 160, and data trustee environment 110 may derive collaborative intelligence from shielded collaborative dataset 160, subject to the one or more constraints. In some cases, an authorized data consumer (e.g., which may be defined by one or more of the constraints) may be the same person or entity that owns or provided raw data (e.g., one or more of datasets 105*a* through 105*n*) or owns the derived collaborative data (e.g., shielded collaborative dataset 160). In some cases, an authorized data consumer may be some other person or entity.

In the embodiment illustrated in FIG. 1, data trustee environment 110 includes constraint manager 115. At a high level, tenants that seek to share data can provide one or more desired computations and constraints (which may be embodied in a contractual agreement) to constraint manager 115 through a user interface of data trustee environment 110. The user interface can enable tenants to specify the desired computations and constraints that will control the use of their data in data trustee environment 110, including eligible data sources (e.g., one or more of datasets 105*a* through 105*n*) and how their data may be processed or shared. Various types of constraints may be implemented, including data access constraints, data processing constraints, data aggregation constraints, data sanitation constraints, some combination thereof, or others. The specified computations and constraints, and other features of a tenant agreement, may be stored in a contact database (not depicted) accessible to constraint manager 115.

In the embodiment illustrated in FIG. 1, data trustee environment 110 includes data privacy pipeline 120. At a high level, data privacy pipeline 120 can accept data from one or more specified sources (e.g., one or more of datasets 105*a* through 105*n*). The data can be ingested, fused, derived, and/or sanitized to generate collaborative data (e.g., one or more of collaborative datasets 107*a* through 107*n*, shielded collaborative dataset 160) based on one or more specified computations and/or constraints. The data privacy pipeline 120 can be provided as a distributed computing or cloud computing service (cloud service) implemented in data trustee environment 110, and can be spun up and spun down as needed. In some embodiments, tenants providing data into data privacy pipeline 120 cannot access the pipeline. Instead, the pipeline outputs collaborative data subject to applicable constraints. Depending on the designated constraints, the collaborative data can be output from data trustee environment 110 as one or more of collaborate datasets 107*a* through 107*n* (e.g., because it has been sanitized according to specified constraints) and/or may be shielded (e.g., stored as shielded collaborative dataset 160) in data trustee environment 110. As explained in more detail below, collaborative dataset 160 can be queried to derive collaborative intelligence subject to the configurable constraints.

In the embodiment illustrated in FIG. 1, data privacy pipeline 120 includes ingestion component 125 (which produces ingested data 130), constrained fusion component 135 (which produces fused joint data 140), constrained computation component 145 (which produces derived joint data 150), and sanitation component 155 (which produces collaborative datasets 107*a* through 107*n* and 160). Initially, one or more of datasets 105*a* through 105 may be provided to data privacy pipeline 120 (e.g., through a user interface, a programming interface, or some other interface of data trustee environment). Ingestion component 125 can determine whether input data or some portion thereof, is joint data pursuant to a contract or other tenant agreement. For example, input data or some portion thereof may be identified in some way, and ingestion component 125 can communicate with constraint manager 115 to confirm whether the identified data is joint data pursuant to a tenant agreement represented in the contract database. Data determined to be joint data can be stored as ingested data 130, and data determined not to be joint data can be dropped.

Ingested data can include data from multiple sources, so constrained fusion component 135 may fuse ingested data from multiple sources according to computations and constraints specified in a tenant agreement. For example, constrained fusion component 135 can communicate with constraint manager 115 to obtain, validate, or request a specified fusion operation pursuant to a tenant agreement represented in the contract database. By way of nonlimiting example, constrained fusion component 135 can implement one or more constraints to combine ingested data (e.g., ingested data 130) to form fused joint data (e.g., fused joint data 140) in any number of ways, including the use of one or more join operations (e.g., left, right, inner, outer, anti), custom joins (e.g., via imperative scripts), data appends, normalization operations, some combination thereof, and others.

Generally, constrained computation component 145 can perform constrained computations (e.g., on ingested data 130, fused joint data 140) to generate derived joint data (e.g., derived joint data 150). Constrained computing can involve any number of specified computations (e.g., arithmetic operations, aggregation, summarization, filtering, sorting, bounding). Generally, constrained computation component 145 can communicate with constraint manager 115 to obtain, validate, or request a specified computation pursuant to a tenant agreement represented in the contract database. By way of a simple example, a number of retailers may agree to expose average sales data, so a corresponding computation may involve averaging. A simple example of a constraint computation is a calculation of average age per city, where the computation is only to be performed for a city if the underlying dataset includes entries for at least five people in the city. These are meant simply as examples, and any type of computation and/or constraint can be implemented.

In some embodiments, sanitation component 155 can perform data sanitation (e.g., on derived joint data 150) to generate collaborative data (e.g., one or more of collaborative datasets 107a through 107n, shielded collaborative dataset 160) in a manner that implements constraints for storage, access, precision, and the like. For example, sanitation component 155 can communicate with constraint manager 115 to obtain, validate, or request a specified sanitation operation pursuant to a tenant agreement represented in the contract database. As such, sanitation component 155 can implement a constraint specified in a tenant agreement that designates whether collaborative data should be shielded (e.g., stored as shielded collaborative dataset 160 in data trustee environment 110), whether collaborative data can be exported (e.g., as one or more of collaborative datasets 107a through 107n), whether exported collaborative data should be restricted (e.g., do not export email, credit card numbers, portions thereof), some combination thereof, and the like. In some embodiments, any or all intermediate data used in arriving at collaborative data (e.g., ingested data, fused joint data, derived joint data) may be deleted, for example, in association with spinning down data privacy pipeline 120. As such, data privacy pipeline 120 can generate collaborative data from data provided by one or more tenants.

As explained above, constraint manager 115 can monitor and orchestrate the use and generation of collaborative data subject to one or more specified constraints. Additionally or alternatively, constraint manager 115 can monitor and orchestrate access to collaborative data subject to the constraints. Generally, constraint manager 115 can communicate with various components in data trustee environment 110 and/or data privacy pipeline 120 to implement specified computations and/or constraints, which may be maintained in a contract database accessible to constraint manager 115. In some embodiments, components can issue requests to constraint manager 115 for permission to execute a particular command, function call, or other executable unit of logic. Constraint manager 115 can evaluate the request and grant or deny permission. In some cases, permission may be granted subject to one or more conditions corresponding to one or more of the constraints. By way of nonlimiting example, some possible conditions that can be implemented include requiring operations that shift, filter, or reshape data (e.g., application of comparison constraints such as only allowing a merge with certain precision), requiring substitution of one or more executable units of logic (e.g., commands or operations) with one or more constrained executable units of logic (e.g., replace average with constrained average), and the like.

Generally, a constraint can be checked, validated, or otherwise enforced at any time or step (e.g., in association with any component of data privacy pipeline 120, data trustee environment 110). Accordingly, corresponding functionality enforcing a constraint can be applied at any step, or multiple steps. In some embodiments, enforcement of certain constraints can be allocated to certain components of data privacy pipeline 120 (e.g., data access constraints get applied by ingestion component 125, processing and aggregation constraints get applied by constrained fusion component 135 and/or constrained computation component 145, sanitation constraints get applied by sanitation component 155). In another example, a particular data access constraint (e.g., only pass data for patients who participated in at least five different studies) may be applied by constrained fusion component 135. These are meant merely as examples, and any suitable constraint enforcement regime may be implemented within the present disclosure.

In some embodiments, constraint manager 115 can enforce a constraint (e.g., precision or aggregation constraints) on a particular executable unit of logic (e.g., for a designated computation, a requested operation) by communicating, indicating, or otherwise facilitating any number of dispositions. In one example, constraint manager 115 can reject a particular executable unit of logic entirely. In another example, constraint manager 115 can allow a particular executable unit of logic, but require the result to be filtered (e.g., no value is returned for a particular row or entry of data). In yet another example, constraint manager 115 can allow a particular executable unit of logic, but require the result to be changed (e.g., precision reduced, a question is answered with false). These and other variations may be implemented.

As constraints are applied to generate collaborative data (e.g., collaborative datasets 107a through 107n, shielded collaborative dataset 160), any combination of schema, constraints, and/or attribution metadata can be associated with the collaborative data, intermediate data used to arrive at the collaborative data (e.g., ingested data 130, fused joint data 140, derived joint data 150), or otherwise. Generally, constraints can be enforced across multiple steps and computations. As such, in some embodiments, applicable and/or satisfied constraints for each step can be tracked and/or associated with data produced by a given component of data privacy pipeline 120. Taking aggregation constraints as an example, once an aggregation constraint has been fulfilled by a particular component of data privacy pipeline 120, downstream components no longer need to consider this constraint. In another example where different constraints have been specified for different datasets to be merged, a merging operation may only need to apply the stricter constraint. Generally, an appropriate allocation or combination of constraints can be applied and/or tracked as data flows through data privacy pipeline 120. This tracking can facilitate validating whether a particular constraint has been applied to particular data. Accordingly, as constraints are applied and data is generated, corresponding schema, applicable or satisfied constraints, and/or attribution metadata indicating ownership or providence of the data can be associated with a dataset, or a corresponding entry, row, field, or other element of data. Generally, the schema, applicable or satisfied constraints, and/or attribution metadata can be generated pursuant to a tenant agreement represented in the contract database (e.g., via communication with constraint manager 115). In some embodiments, any or all intermediate data used in arriving at collaborative data (e.g., ingested data 130, fused joint data 140, derived joint data 150) may be deleted, and collaborative data may be stored in data trustee environment 110 as shielded collaborative dataset 160 and/or exported as one or more of collaborative datasets 107a through 107n, depending on an applicable constraint.

In some embodiments, data trustee environment 110 includes constrained querying component 170, which can apply constraint querying to allow data consumers (e.g., operating one of data consumer devices 103a through 103n) to query collaborative data (e.g., shielded collaborative dataset 160) in data trustee environment 110 subject to one or more specified constraint. At a high level, constrained querying component 170 can operate as a search engine that allows data consumers to access or derive collaborative intelligence from shielded collaborative dataset 160, without exposing raw data provided by a tenant (e.g., one or more of datasets 105a through 105n), intermediate data used to generate the shielded collaborative dataset 160 (e.g., ingested data 10, fused joint data 140, derived joint data 150), and/or shielded collaborative dataset 160. Generally, constrained querying component 170 can communicate with constraint manager 115 to obtain, validate, or request a specified operation pursuant to a tenant agreement represented in the contract database. Constrained querying component 170 can facilitate enforcement of constraints in response to a query in any number of ways, including reformatting a query prior to execution, applying constraints after executing a query, constraining eligible queries for execution (e.g., only permit a set of whitelisted queries), applying access constraints prior to execution, and others.

Figure 2:
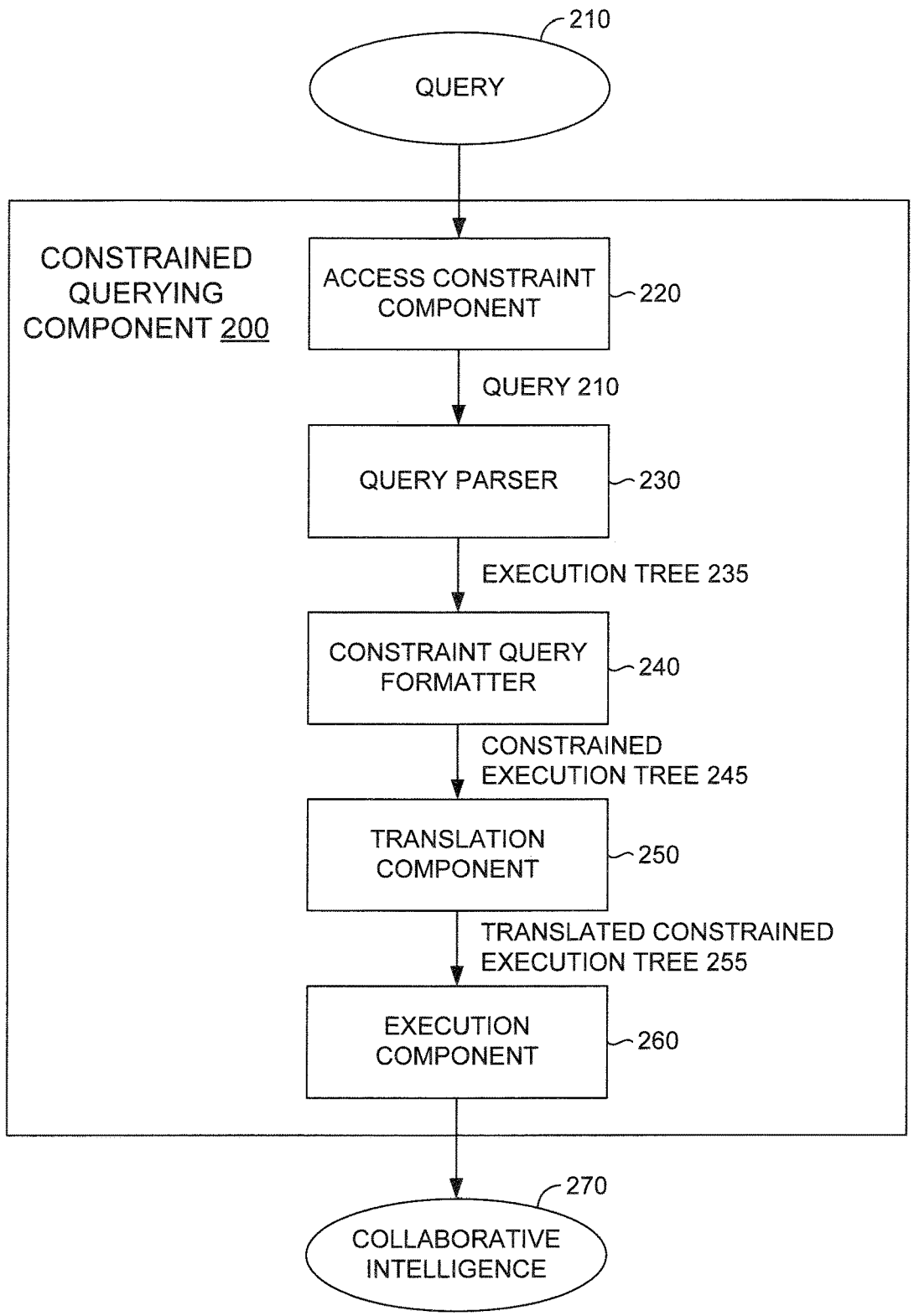
FIG. 2 is a block diagram of an example constrained querying component, in accordance with embodiments described herein.

Turning now to FIG. 2, FIG. 2 is a block diagram of an example constrained querying component 200, in accordance with embodiments described herein. Constrained querying component 200 may correspond with constrained querying component 170 of FIG. 1. At a high level, constrained querying component 200 can operate as a search engine, enabling data consumers to query collaborative data and derive collaborative intelligence therefrom, subject to one or more constraints designated in a corresponding tenant agreement. By way of background, queries are generally not executable code. In order to execute a query, the query is normally converted into an execution tree, which serves as the basis for an execution plan that is executable. Generally, constrained querying component 200 can enforce constraints, or facilitate the enforcement of constraints, by reformatting an execution tree corresponding to a received query to account for any applicable constraints prior to execution. In a simple example, a constraint may permit queries on compensation data, but the result has to be rounded. As such, the query and/or its corresponding execution tree can be reformatted prior to execution, such that any returned search results account for applicable constraints. In the embodiment illustrated in FIG. 1, constrained querying component 200 includes access constraint component 220, query parser 230, constraint query formatter 240, translation component 250, and execution component 260. This configuration is meant merely as an example, and other configurations with similar or different functionality may be implemented in accordance with the present disclosure.

At a high level, constrained querying component 200 may receive query 210 issued by a data consumer (e.g., operating one of data consumer devices 103a through 103n of FIG. 1) requesting collaborative intelligence based on collaborative data (e.g., shielded collaborative dataset 160 of FIG. 1). Query 210 may take any suitable form or query language, and may comprise one or more requested operations on collaborative data. In some embodiments, query 210 may specify or otherwise be associated with runtime information, such as information identifying the requesting data consumer issuing the query, information identifying an applicable tenant agreement, information identifying target collaborative data on which to operate, and the like.

In some embodiments, access constraint component 220 can use the runtime information associated with query 210 to trigger a lookup and enforcement of an applicable data access constraint (e.g., via communication with constraint manager 115 of FIG. 1). For example, access constraint component 220 can validate query 210 against a corresponding constraint context comprising an applicable data access constraint and the runtime information associated with query 210. Generally, in scenarios where a data consumer is not authorized to access a collaborative dataset, target collaborative data within a collaborative dataset (e.g., a particular row of data), a particular type of requested collaborative intelligence to be derived, access constraint component 220 can deny the request. In this case, access constraint component 220 may return a notification to the issuing data consumer informing the data consumer that the requested query was denied. If the requested access is determined to be authorized and/or consistent with an applicable data access constraint, query 210 can be passed to query parser 230.

Generally, query parser 230 can parse query 210 and generate a corresponding execution tree 235. At a high level, execution tree 235 comprises a hierarchical arrangement of executable units of logic that, when executed, implement query 210. The executable units of logic can include any suitable arrangement and combination of commands, operations, function calls, and the like. Constraint query formatter 240 can access applicable constraints (e.g., via communication with constraint manager 115 of FIG. 1) and can validate the executable units of logic of execution tree 235 against the constraints. In some embodiments, if one or more of the executable units of logic is not allowed, query 210 can effectively be reformatted by adding, removing, and/or altering one or more executable units of logic based on one or more constraints.

More specifically, constraint query formatter 240 can reformat execution tree 235 into constrained execution tree 245 by traversing execution tree 235 and replacing executable units of logic inconsistent with a particular constraint with custom executable units of logic that are consistent with the constraint. Additionally or alternatively, constraint query formatter 240 can add or remove one or more executable units of logic to enforce constraints (e.g., precision constraints) on the output. Generally, constraint query formatter 240 can validate an executable unit of logic of execution tree 235 against a corresponding constraint context comprising an applicable constraint and the runtime information associated with query 210. This check can involve validation of a constituent command or operation, one or more constituent parameters, and/or consideration of other parts of execution tree 235, and can result in a number of possible results. For example, an executable unit of logic can be allowed (e.g., the executable unit of logic can be copied into constrained execution tree 245), an executable unit of logic can be disallowed (e.g., query 210 can be disallowed in its entirety), or an executable unit of logic can be allowed but with changes (e.g., copying a corresponding constrained executable unit of logic into constrained execution tree 245). These are meant simply as examples, and other variations are contemplated within the present disclosure.

As such, constraint query formatter 240 can evaluate each executable unit of logic against the constraints, add or remove executable units of logic, and/or replace one or more executable units of logic inconsistent with a constraint with a custom executable unit of logic that incorporates and/or applies the constraint. Mappings between executable units of logic and custom executable units of logic and/or executable units of logic corresponding to one or more constraints (e.g., a list of rules) can be retrieved, accessed, and/or maintained in any suitable manner (e.g., stored locally, accessed via communication with constraint manager 115 of FIG. 1, some combination thereof, or otherwise). Mappings can be one-to-one, one-to-many, or many-to-one.

In some embodiments, a received query may not be in the same query language used by the target collaborative dataset (e.g., shielded collaborative dataset 160 of FIG. 1). As such, translation component 250 can translate constrained execution tree 245 from a first query language to a second query language. That is, translation component can translate constrained execution tree 245 into translated constrained execution tree 255. Any suitable query language may be implemented (e.g., SQL, SparkQL, Kusto Query Language, C # Ling). In some embodiments, constrained execution tree 245 and/or translated constrained execution tree 255 can be executed to test for failure, and a failure may result in rejection of a particular execution, a set of executable units of logic, the entire query 210, or otherwise.

A resulting execution tree (e.g., constrained execution tree 245 and/or translated constrained execution tree 255, as the case may be) can be passed to execution component 260 for execution (e.g., execution of a corresponding execution plan). Generally, this execution operates to derive collaborative intelligence 270 from collaborative data. In some embodiments, collaborative intelligence 270 is returned to the requesting data consumer as is. In some embodiments, one or more constraints may additionally or alternatively be enforced on collaborative intelligence 270 prior to transmission to the requesting data consumer.

Figures 3A, 3B:
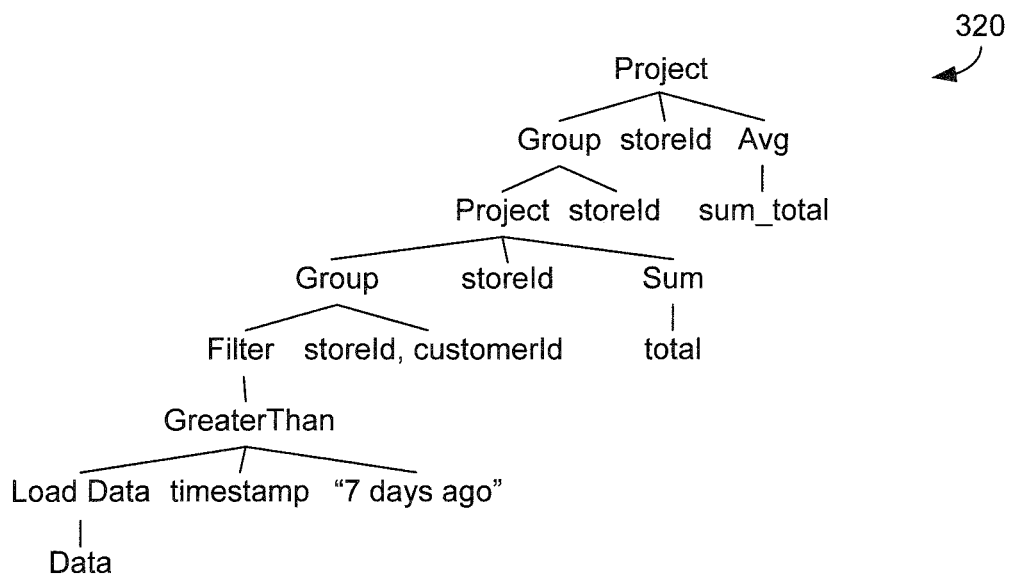
FIG. 3A is an example of an issued query.
FIG. 3B is an example of a corresponding execution tree, in accordance with embodiments described herein.

By way of nonlimiting example, assume that pursuant to a particular tenant agreement, a number of retailers have agreed to expose sales data that includes some sensitive customer information that should not be exposed. In this example, the tenant agreement specifies a number of constraints, including requirements of at least 20 unique customers per aggregation, aggregations must span at least 48 hours, no aggregation by userid, no export of userid, and round numeric results to the nearest two digits. Assume further that the tenant agreement allows a data consumer to derive the average amount of money spent by each customer in each store each week. FIG. 3A illustrates an example of a corresponding query 310 in Structured Query Language (SQL). This query language is meant merely as an example, and any suitable query structure may be implemented.

Query 310 may be parsed and converted into a corresponding execution tree (e.g., by query parser 230 of FIG. 2). FIG. 3B illustrates a simplified representation of an example execution tree 320 that corresponds with query 310 of FIG. 3A. Generally, in a query execution tree, each executable unit of logic receives data from a previous executable unit of logic and one or more parameters for transforming the data. When executing execution tree 320, data gets passed along the left branch of execution tree 320, from the bottom to the top. As the data gets passed, each executable unit of logic applies one or more associated commands or operations. As will be appreciated by those of ordinary skill in the art, execution tree 320 comprises a hierarchical arrangement of executable units of logic that, if executed, would implement query 310.

Figure 4A:
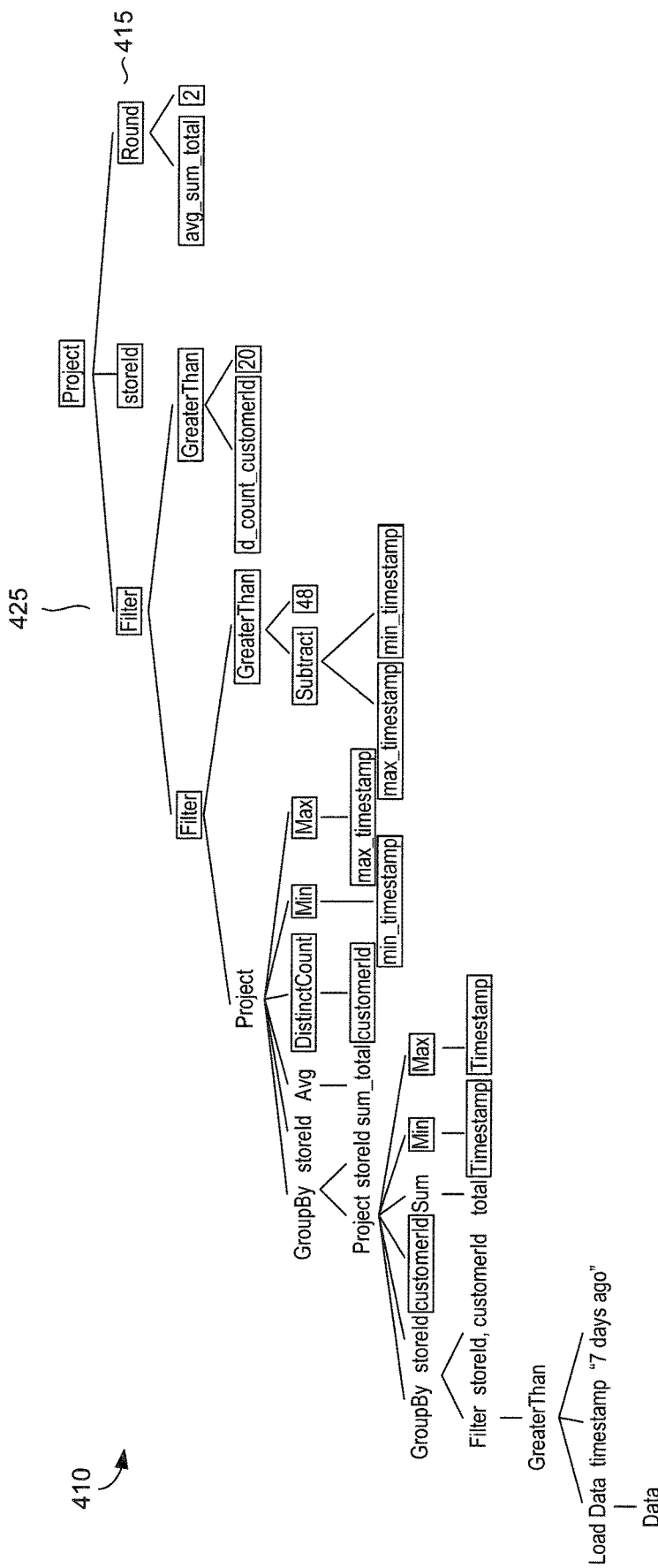
FIG. 4A is an example of a constrained execution tree.

To account for applicable constraints, execution tree 320 can be converted into constrained execution tree 410 of FIG. 4A (e.g., by constraint query formatter 240 of FIG. 2). Differences between execution tree 320 of FIG. 3B and constrained execution tree 410 of FIG. 4A are illustrated with boxes drawn around the different elements. For example, constrained execution tree 410 includes a rounding operation 415 that implements the constraint described above in which numeric results must be rounded to the nearest two digits. In another example, constrained execution tree 410 includes a filtering operation 425 that implements the constraint described above in which aggregations must include data for at least 20 unique customers. This configuration for constrained execution tree 410 is simply meant as an example, and any suitable configuration may be implemented. FIG. 4B illustrates an example of a corresponding query 420 that corresponds with constrained execution tree 410, for illustration purposes. As will be appreciated, query 420 includes additional elements not present in query 310 that serve to enforce the example constraints described above. Constrained execution tree 410 can be executed by traversing and executing the hierarchy of executable units of logic of the tree along the left branch, from bottom to top, as will be appreciated by those of ordinary skill in the art. As such, constrained execution tree 410 can be executed to derive collaborative intelligence, and the collaborative intelligence can be returned to a requesting data consumer.

Example Flow Diagrams

With reference to FIGS. 5-10, flow diagrams are provided illustrating various methods relating to generation of collaborative intelligence. The methods can be performed using the collaborative intelligence environment described herein. In embodiments, one or more computer storage media having computer-executable instructions embodied thereon can, when executed by one or more processors, cause the one or more processors to perform the methods in the autonomous upgrade system.

Figure 5:
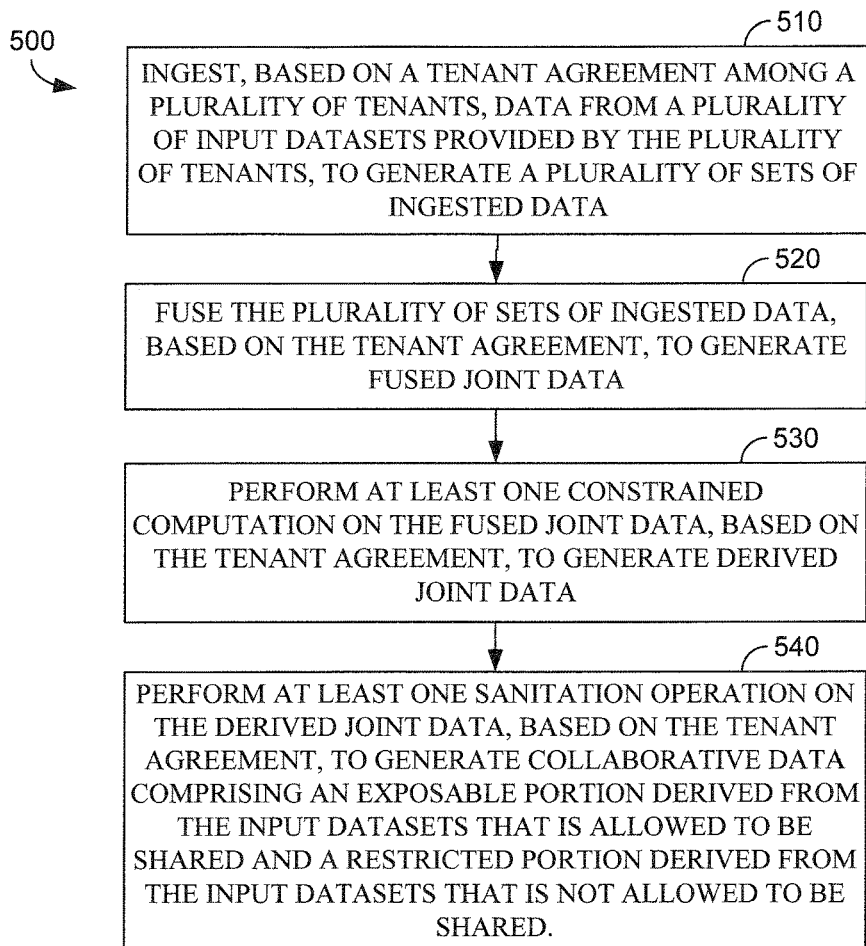
FIG. 5 is a flow diagram showing an example method for generating collaborative data, in accordance with embodiments described herein.

Turning now to FIG. 5, a flow diagram is provided that illustrates a method 500 for generating collaborative data. Initially at block 510, data from a plurality of input datasets provided by the plurality of tenants is ingested, based on a tenant agreement among a plurality of tenants, to generate a plurality of sets of ingested data. At block 520, the plurality of sets of ingested data are fused, based on the tenant agreement, to generate fused joint data. At block 530, at least one constrained computation is performed on the fused joint data, based on the tenant agreement, to generate derived joint data. At block 540, at least one sanitation operation is performed on the derived joint data, based on the tenant agreement, to generate collaborative data. The collaborative data comprises an exposable portion derived from the input datasets that is allowed to be shared and a restricted portion derived from the input datasets that is not allowed to be shared.

Figure 6:
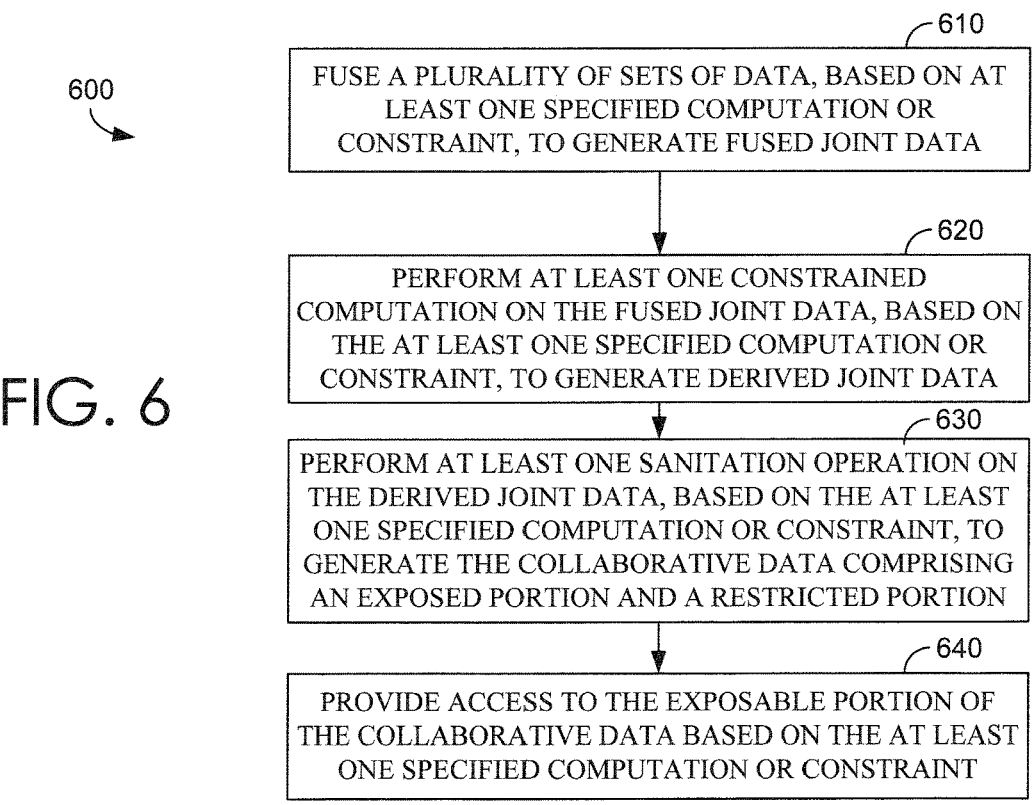
FIG. 6 is a flow diagram showing an example method for generating collaborative data, in accordance with embodiments described herein.

Turning now to FIG. 6, a flow diagram is provided that illustrates a method 600 for generating collaborative data. Initially at block 610, a plurality of sets of data are fused, based on at least one specified computation or constraint, to generate fused joint data. At block 620, at least one constrained computation is performed on the fused joint data, based on the at least one specified computation or constraint, to generate derived joint data. At block 630, at least one sanitation operation is performed on the derived joint data, based on the at least one specified computation or constraint, to generate the collaborative data. The collaborative data comprises an exposable portion derived from the plurality of sets of data that is allowed to be shared and a restricted portion derived from the plurality of sets of data that is not allowed to be shared. At block 640, access to the exposable portion of the collaborative data is provided based on the at least one specified computation or constraint.

Turning now to FIG. 7, a flow diagram is provided that illustrates a method 700 for providing constrained computations for collaborative data in a data trustee environment. Initially at block 710, a request is received for permission to execute a requested executable unit of logic associated with generation of collaborative data in a data trustee environment from a plurality of input datasets provided by a plurality of tenants. At block 720, at least one constraint associated with the collaborative data is accessed in response to receiving the request. At block 730, the generation of the collaborative data is enabled by resolving the request based on the at least one constraint. The collaborative data includes an exposable portion that is allowed to be shared and a restricted portion that is not allowed to be shared. The data trustee environment is configured to provide the plurality of tenants access to the exposable portion of the collaborative data without exposing the restricted portion.

Turning now to FIG. 8, a flow diagram is provided that illustrates a method 800 for providing constrained access to collaborative data in a data trustee environment. Initially at block 810, a request is received for permission to execute a requested executable unit of logic associated with access to the collaborative data. The collaborative data is based on a plurality of input datasets provided by a plurality of tenants. The collaborative data includes an exposable portion that is derived from the plurality of input datasets and is allowed to be shared. The collaborative data includes a restricted portion that is derived from the plurality of input datasets and is not allowed to be shared. At block 820, at least one constraint associated with the collaborative data is accessed in response to receiving the request. At block 830, the access to the collaborative data is enabled by resolving the request based on the at least one constraint.

Figure 9:
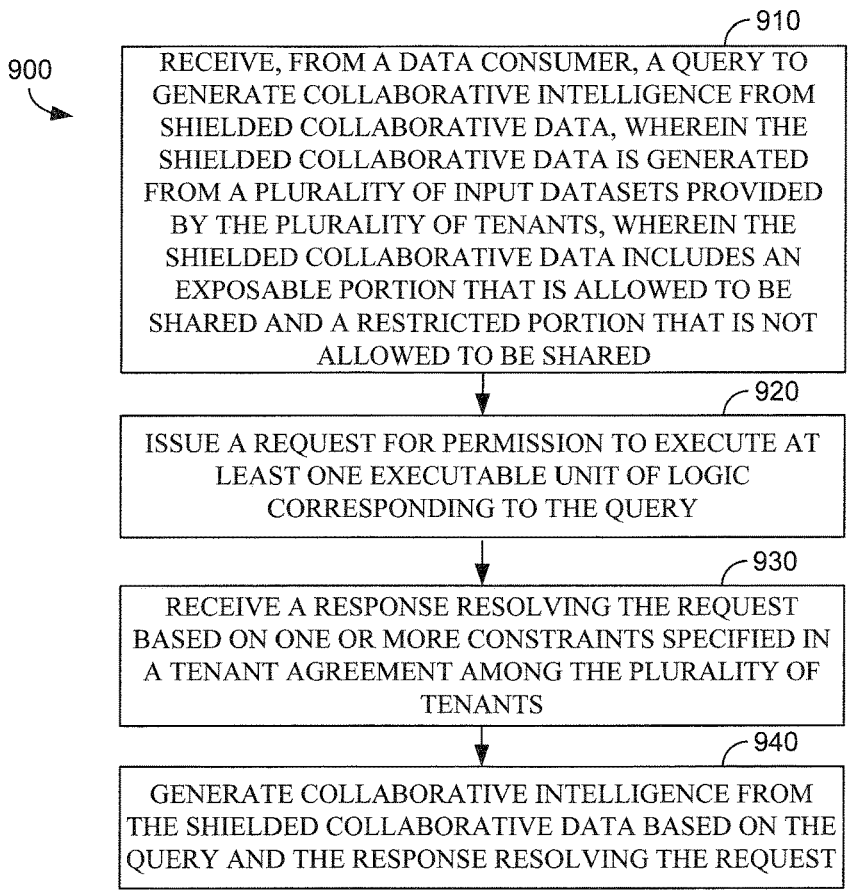
FIG. 9 is a flow diagram showing an example method for constraint querying, in accordance with embodiments described herein.

Turning now to FIG. 9, a flow diagram is provided that illustrates a method 900 for constraint querying. Initially at block 910, a query to generate collaborative intelligence from shielded collaborative data is received from a data consumer. The shielded collaborative data is generated from a plurality of input datasets provided by the plurality of tenants. The shielded collaborative data includes an exposable portion that is allowed to be shared and a restricted portion that is not allowed to be shared. At block 920, a request for permission to execute at least one executable unit of logic corresponding to the query is issued. At block 930, a response is received resolving the request based on one or more constraints specified in a tenant agreement among the plurality of tenants. At block 940, collaborative intelligence is generated from the shielded collaborative data based on the query and the response resolving the request.

Figure 10:
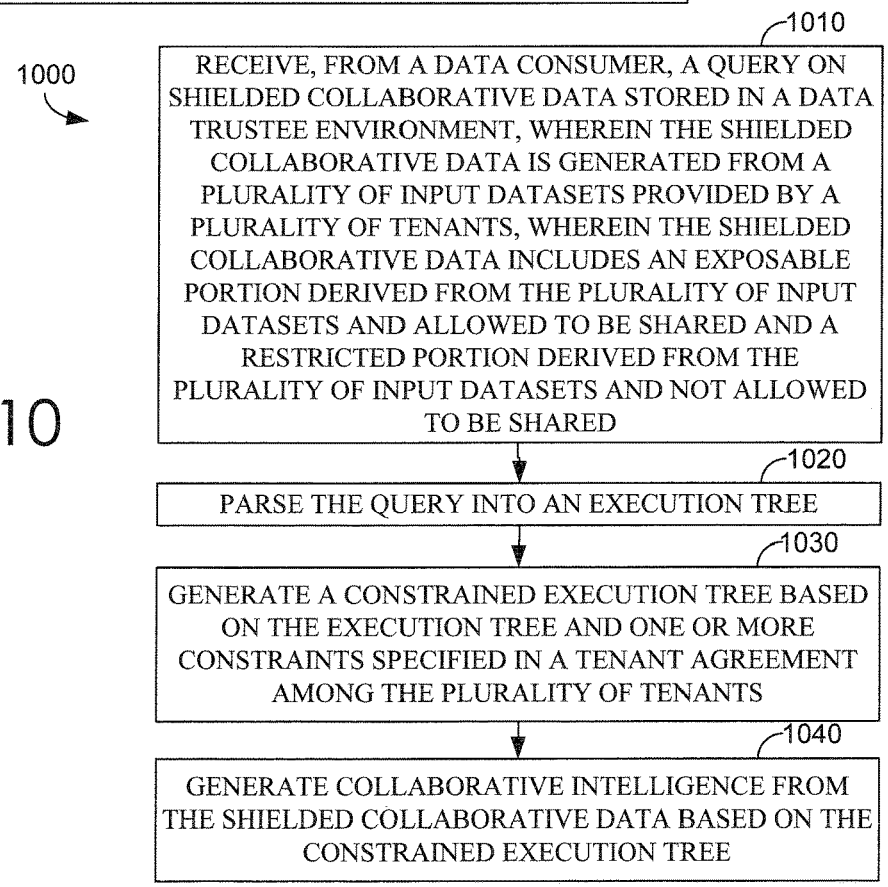
FIG. 10 is a flow diagram showing an example method for constrained querying, in accordance with embodiments described herein.

Turning now to FIG. 10, a flow diagram is provided that illustrates a method 1000 for constrained querying. Initially at block 1010, a query on shielded collaborative data stored in a data trustee environment is received from a data consumer. The shielded collaborative data is generated from a plurality of input datasets provided by a plurality of tenants. The shielded collaborative data includes an exposable portion derived from the plurality of input datasets and allowed to be shared and a restricted portion derived from the plurality of input datasets and not allowed to be shared. At block 1020, the query is parsed into an execution tree. At block 1030, a constrained execution tree is generated based on the execution tree and one or more constraints specified in a tenant agreement among the plurality of tenants. At block 1040, collaborative intelligence is generated from the shielded collaborative data based on the constrained execution tree.

Example Distributed Computing Environment

Figure 11:
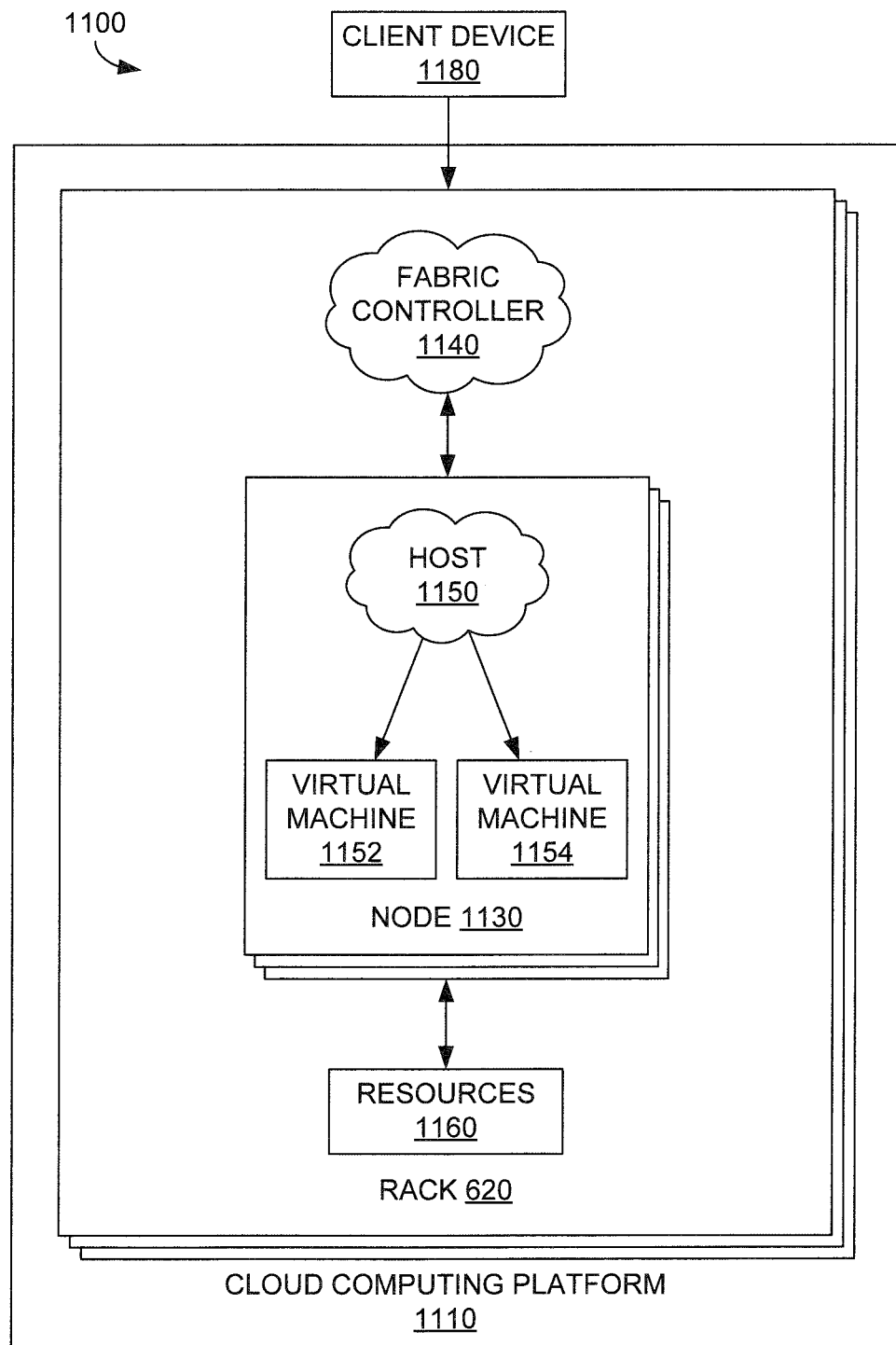
FIG. 11 is a block diagram of an example computing environment suitable for use in implementing embodiments described herein.

Referring now to FIG. 11, FIG. 11 illustrates an example distributed computing environment 1100 in which implementations of the present disclosure may be employed. In particular, FIG. 11 shows a high level architecture of an example cloud computing platform 1110 that can host a collaborative intelligence environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 1100 that includes cloud computing platform 1110, rack 1120, and node 1130 (e.g., computing devices, processing units, or blades) in rack 1120. The collaborative intelligence environment and/or data trustee environment can be implemented with cloud computing platform 1110 that runs cloud services across different data centers and geographic regions. Cloud computing platform 1110 can implement fabric controller 1140 component for provisioning and managing resource allocation, deployment, upgrade, and management of cloud services. Typically, cloud computing platform 1110 acts to store data or run service applications in a distributed manner. Cloud computing infrastructure 1110 in a data center can be configured to host and support operation of endpoints of a particular service application. Cloud computing infrastructure 1110 may be a public cloud, a private cloud, or a dedicated cloud.

Node 1130 can be provisioned with host 1150 (e.g., operating system or runtime environment) running a defined software stack on node 1130. Node 1130 can also be configured to perform specialized functionality (e.g., compute nodes or storage nodes) within cloud computing platform 1110. Node 1130 is allocated to run one or more portions of a service application of a tenant. A tenant can refer to a customer utilizing resources of cloud computing platform 1110. Service application components of cloud computing platform 1110 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 1130, nodes 1130 may be partitioned into virtual machines (e.g., virtual machine 1152 and virtual machine 1154). Physical machines can also concurrently run separate service applications. The virtual machines or physical machines can be configured as individualized computing environments that are supported by resources 1160 (e.g., hardware resources and software resources) in cloud computing platform 1110. It is contemplated that resources can be configured for specific service applications. Further, each service application may be divided into functional portions such that each functional portion is able to run on a separate virtual machine. In cloud computing platform 1110, multiple servers may be used to run service applications and perform data storage operations in a cluster. In particular, the servers may perform data operations independently but exposed as a single device referred to as a cluster. Each server in the cluster can be implemented as a node.

Client device 1180 may be linked to a service application in cloud computing platform 1110. Client device 1180 may be any type of computing device, which may correspond to computing device 1100 described with reference to FIG. 11, for example. Client device 1180 can be configured to issue commands to cloud computing platform 1110. In embodiments, client device 1180 may communicate with service applications through a virtual Internet Protocol (IP) and load balancer or other means that direct communication requests to designated endpoints in cloud computing platform 1110. The components of cloud computing platform 1110 may communicate with each other over a network (not shown), which may include, without limitation, one or more local area networks (LANs) and/or wide area networks (WANs).

Example Operating Environment

Figure 12:
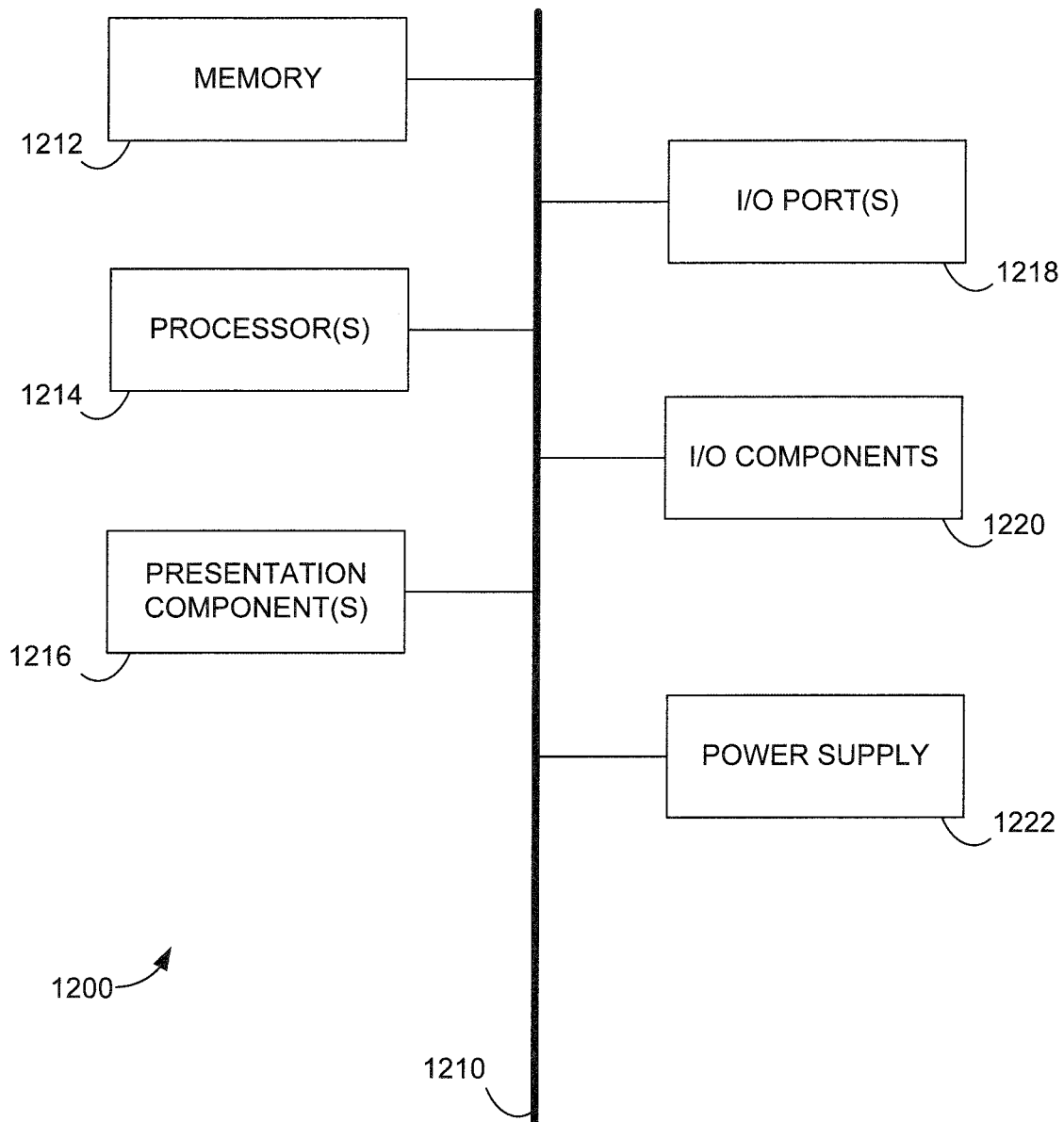
FIG. 12 is a block diagram of an example computing environment suitable for use in implementing embodiments described herein.

Having briefly described an overview of embodiments of the present invention, an example operating environment in which embodiments of the present invention may be implemented is described below in order to provide a general context for various aspects of the present invention. Referring initially to FIG. 12 in particular, an example operating environment for implementing embodiments of the present invention is shown and designated generally as computing device 1200. Computing device 1200 is but one example of a suitable computing environment and is not intended to suggest any limitation as to the scope of use or functionality of the invention. Neither should computing device 1200 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 12, computing device 1200 includes bus 1210 that directly or indirectly couples the following devices: memory 1212, one or more processors 1214, one or more presentation components 1216, input/output ports 1218, input/output components 1220, and illustrative power supply 1222. Bus 1210 represents what may be one or more buses (such as an address bus, data bus, or combination thereof). The various blocks of FIG. 12 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 12 is merely illustrative of an example computing device that can be used in connection with one or more embodiments of the present invention. Distinction is not made between such categories as "workstation," "server," "laptop," "hand-held device," etc., as all are contemplated within the scope of FIG. 12 and reference to "computing device."

Computing device 1200 typically includes a variety of computer-readable media. Computer-readable media can be any available media that can be accessed by computing device 1200 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1212 includes computer storage media in the form of volatile and/or nonvolatile memory. The memory may be removable, non-removable, or a combination thereof. Exemplary hardware devices include solid-state memory, hard drives, optical-disc drives, etc. Computing device 1200 includes one or more processors that read data from various entities such as memory 612 or I/O components 1220. Presentation component(s) 1216 present data indications to a user or other device. Exemplary presentation components include a display device, speaker, printing component, vibrating component, etc.

I/O ports 1218 allow computing device 1200 to be logically coupled to other devices including I/O components 1220, some of which may be built in. Illustrative components include a microphone, joystick, game pad, satellite dish, scanner, printer, wireless device, etc.

With reference to the collaborative intelligence environment described herein, embodiments described herein support constraint computing and/or constraint querying. The components of the collaborative intelligence environment can be integrated components that include a hardware architecture and a software framework that support constraint computing and/or constraint querying functionality within a collaborative intelligence system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the collaborative intelligence system can include an API library that includes specifications for routines, data structures, object classes, and variables may support the interaction between the hardware architecture of the device and the software framework of the collaborative intelligence system. These APIs include configuration specifications for the collaborative intelligence system such that the different components therein can communicate with each other in the collaborative intelligence system, as described herein.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the collaborative intelligence environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A data trustee environment comprising:
one or more hardware processors and memory configured to provide computer program instructions to the one or more hardware processors;
a constrained querying component configured to use the one or more hardware processors to:
receive, from a data consumer, a query on shielded collaborative data stored in the data trustee environment, the shielded collaborative data generated in the data trustee environment from a plurality of input datasets provided by a plurality of tenants, wherein the data trustee environment is configured to prevent exposure of at least a restricted portion of the shielded collaborative data to any of the plurality of tenants and the data consumer based on a representation of a tenant agreement among the plurality of tenants that is stored in the data trustee environment;
convert an execution tree that represents the query into a constrained execution tree that implements at least one constraint of one or more constraints specified in the tenant agreement; and
generate collaborative intelligence from the shielded collaborative data based on the constrained execution tree.

2. The data trustee environment of claim 1, wherein the constrained querying component is configured to reformat the query, prior to execution, to comply with the one or more constraints.

3. The data trustee environment of claim 1, wherein execution of the query generates results, and wherein the constrained querying component is configured to apply a particular constraint of the one or more constraints to the results after the query is executed.

4. The data trustee environment of claim 1, wherein the constrained querying component is configured to constrain eligible queries for execution to a set of whitelisted queries.

5. The data trustee environment of claim 1, wherein the constrained querying component is configured to apply, prior to execution of the query, one or more access constraints specified in the tenant agreement based on runtime information associated with the query.

6. The data trustee environment of claim 1, wherein the constrained querying component is configured to parse the query into the execution tree, prior to converting the execution tree into the constrained execution tree.

7. The data trustee environment of claim 1, wherein the constrained querying component is configured to translate from a first query language associated with the query to a second query language associated with the shielded collaborative data.

8. One or more computer storage media storing computer-useable instructions that, when used by one or more computing devices, cause the one or more computing devices to perform operations comprising:
receiving, from a data consumer, a query to generate collaborative intelligence from shielded collaborative data generated from a plurality of input datasets provided by a plurality of tenants, wherein the shielded collaborative data includes at least a restricted portion that is not allowed to be shared with any of the tenants or the data consumer based on a tenant agreement among the plurality of tenants;
issuing a request for permission to execute an executable unit of logic of an execution tree representing the query;
receiving a response resolving the request based on one or more constraints specified in the tenant agreement; and
generating the collaborative intelligence from the shielded collaborative data based on the query and the response resolving the request.

9. The one or more computer storage media of claim 8, wherein generating the collaborative intelligence comprises applying a set of the one or more constraints after execution of the query.

10. The one or more computer storage media of claim 8, wherein the query is part of a whitelist of eligible queries on the shielded collaborative data specified in the tenant agreement.

11. The one or more computer storage media of claim 8, the operations further comprising applying, prior to execution of the query, access constraints specified in the tenant agreement by validating the query against a corresponding constraint context comprising runtime information associated with the query.

12. The one or more computer storage media of claim 8, wherein generating the collaborative intelligence comprises generating a constrained execution tree that is consistent with the one or more constraints, wherein generating the constrained execution tree is based on mappings between executable units of logic and custom executable units of logic corresponding to the one or more constraints.

13. The one or more computer storage media of claim 8, wherein generating the collaborative intelligence based on the response resolving the request comprises executing a constrained execution tree that adds to the execution tree at least one operation that implements a constraint of the one or more constraints specified in the tenant agreement.

14. A method comprising:
receiving, from a data consumer, a query on shielded collaborative data stored in a data trustee environment, the shielded collaborative data generated from a plurality of input datasets provided by a plurality of tenants, wherein the data trustee environment is configured to prevent exposure of at least a restricted portion of the shielded collaborative data to any of the plurality of tenants and the data consumer based on a representation of a tenant agreement among the plurality of tenants that is stored in the data trustee environment;
parsing the query into an execution tree;
converting the execution tree into a constrained execution tree that implements one or more constraints specified in the tenant agreement; and
generating collaborative intelligence from the shielded collaborative data based on the constrained execution tree.

15. The method of claim 14, further comprising validating the query against a corresponding constraint context comprising an applicable data access constraint specified in the tenant agreement and runtime information associated with the query.

16. The method of claim 14, wherein converting the execution tree into the constrained execution tree comprises traversing executable units of logic of the execution tree and replacing one of the executable units of logic that is inconsistent with the one or more constraints with a different executable unit of logic that is consistent with the one or more constraints.

17. The method of claim 14, wherein converting the execution tree into the constrained execution tree comprises replacing one or more executable units of logic that are inconsistent with the one or more constraints with a custom executable unit of logic that enforces the one or more constraints.

18. The method of claim 14, wherein converting the execution tree into the constrained execution tree is based on mappings between executable units of logic and custom executable units of logic corresponding to the one or more constraints.

19. The method of claim 14, further comprising applying one or more access constraints specified in the tenant agreement to the query prior to generating the constrained execution tree.

20. The method of claim 14, wherein converting the execution tree into the constrained execution tree comprises issuing requests for permission to execute executable units of logic of the execution tree.

* * * * *